Figure 1:
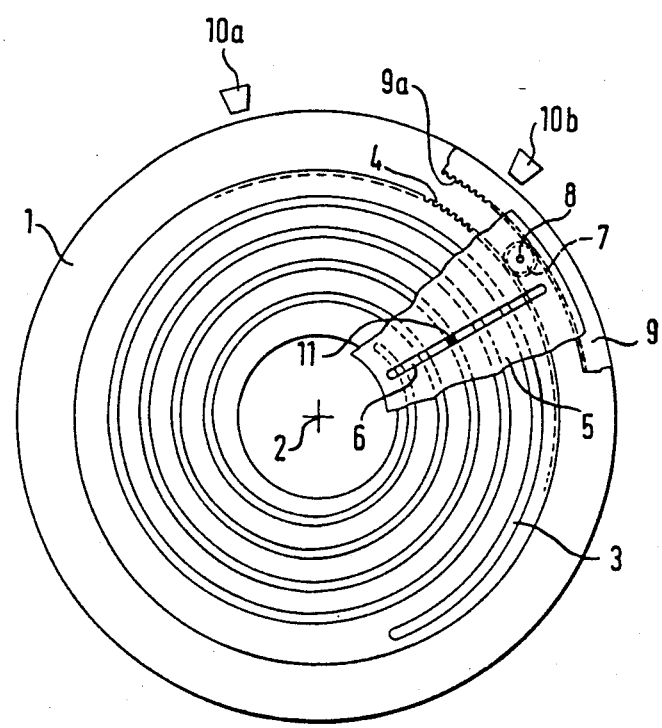

United States Patent [19]

Küpper et al.

[11] Patent Number: 4,655,730
[45] Date of Patent: Apr. 7, 1987

[54] AUTOMATIC GEAR BOX

[76] Inventors: Gerd Küpper, August-Schucken-Bäumer-Str. 16, 4902 Bad Salzuflen 5; Horst Fenzl, Pieperweg 84, 4811 Oerlinghausen; Siegfried Zabinski, Berliner Strasse 9, 4800 Bielefeld 14, all of Fed. Rep. of Germany

[21] Appl. No.: 764,249

[22] Filed: Aug. 9, 1985

[30] Foreign Application Priority Data

Dec. 28, 1984 [EP] European Pat. Off. ........ 84116442.9

[51] Int. Cl.[4] .............................................. F16H 9/10
[52] U.S. Cl. ..................................................... 474/53
[58] Field of Search ............................. 474/47, 49–54, 474/56

[56] References Cited

U.S. PATENT DOCUMENTS

| 3,850,045 | 11/1974 | Hagen | 74/244 |
| 4,068,539 | 1/1978 | Nyc | 74/230.18 |
| 4,342,559 | 8/1982 | Williams | 474/53 X |

FOREIGN PATENT DOCUMENTS

| 0084160 | 7/1983 | European Pat. Off. | |
| 801874 | 1/1951 | Fed. Rep. of Germany | 474/53 |
| 79/00016 | 8/1979 | PCT Int'l Appl. | |
| 82/01422 | 4/1983 | PCT Int'l Appl. | |

Primary Examiner—James A. Leppink
Assistant Examiner—Frank H. McKenzie, Jr.

[57] ABSTRACT

The invention relates to a drive device having stepless torque adjustment, especially for cycles. The drive device comprises a drive shaft (13), a first adjusting disc (1) arranged coaxially with the drive shaft (13), into which first adjusting disc (1) a spiral-like cutout (3) is incorporated at least partially about the center of the first adjusting disc (1), a second coaxially arranged adjusting disc (5) into which through slots (6) are incorporated which run outwards from the center of the second adjusting disc (5), and a coaxial segmented ring (27) consisting of individual segments (28) onto the outer periphery of which segmented ring (27) can be placed an endless drive element (30). The segments (28) each have extensions (43) which engage both in the spiral-like cutout (3) and in an allocated through slot (6). One of the said adjusting discs can be driven by the drive shaft (13), whereas the other non-driven adjusting disc can be blocked by means of a blocking device (10a and 10b). When one adjusting disc is blocked and the other rotates, the diameter of the segmented ring (27) can be continuously changed, so that the torque is infinitely adjustable to the desired value.

23 Claims, 13 Drawing Figures

AUTOMATIC GEAR BOX

DESCRIPTION

The invention relates to a drive device having a stepless torque adjustment.

Such a drive device is normally used as an automatic transmission and is connected to a machine or wheel axle, which is to be driven, in order to continuously adjust by stepless torque adjustment the ratio between the outer drive power and the power acting on the machine or wheel axle.

The object of the invention is to create a drive device having stepless torque adjustment and which has a simple and robust construction and ensures reliable operation.

This object is achieved according to the invention, when a drive shaft is rotatably mounted by means of a bearing device, a first adjusting disc is arranged coaxially with a drive shaft, into which adjusting disc is incorporated a spiral-like cutout at least partially around the center of the first adjusting device, a second adjusting disc is arranged coaxially with the drive shaft, into which adjusting disc are incorporated through slots which run outwards from the center of the second adjusting disc, a segmented ring consisting of individual segments is arranged coaxially with the drive shaft, onto the outer periphery of which segmented ring can be placed an endless drive element, the segments each have extension portions which engage both in the spiral-like cutout and in an allocated through slot, one of the said adjusting discs can be driven by the drive shaft, and when the other non-driven adjusting disc can be blocked relative to the bearing device by means of a blocking device.

By means of these measures, when there is a desired change in torque, the diameter of the segmented ring can be increased or reduced as a result of the relative movement between the first and second adjusting disc. For this purpose, the second adjusting disc, which has the radial slots, is firmly connected, for example, to the drive shaft, whereas the first adjusting disc, which has the spiral-like cutout, can be blocked for changing the diameter. Depending on the direction of rotation of the second adjusting disc, the diameter of the segmented ring is then increased or reduced. Power is transmitted onto a machine axle or wheel axle, which is to be driven by an endless drive element which sits on the periphery of the segmented ring and grips around a drive element adapted to the machine or wheel axle. Torque acting on the drive shaft of the drive device is consequently infinitely adjustable and is transmitted onto the drive element of the machine or wheel axle. Moreover, the drive element sitting on the machine or wheel axle can also be a segmented ring, the diameter of which can be changed by means of two adjusting discs, as already mentioned. The machine or wheel axle then corresponds to the drive shaft.

The said device can preferably be used in connection with cycles, for example bicycles, with the drive shaft of the drive device being connected to pedals. The drive element, arranged for example on the rear wheel axle of a bicycle, can then be a gear wheel which only drives the rear wheel axle in one direction of rotation and freewheels relative to the rear wheel axle in the opposite direction of rotation. In this case, the endless drive element is a suitably designed chain.

If the torque is not to be adjusted, the first adjusting disc rotates with the second adjusting disc without there being relative movement between the two. In this case, the diameter of the segmented ring remains constant.

According to an advantageous embodiment of the invention, the spiral-like cutout in the first adjusting disc is a groove, with the second adjusting disc being arranged on the side of the spiral-like groove. The spiral-like groove can have several coils in the first adjusting disc, so that a very fine adjustment of the torque is possible.

According to an advantageous further development of the invention, one adjusting disc, on its outer peripheral area and on the side facing towards the other adjusting disc, carries a pinion which is freely rotatable about an axle running parallel to the drive shaft. The pinion meshes with a first gear wheel attached to the other adjusting disc. Moreover, an outer ring is available which, on its inner periphery, carries a second gear rim with which the pinion also meshes. This outer ring can only be blocked relative to the bearing device if the adjusting disc which can be blocked is in the unblocked condition.

This ensures that the diameter of the segmented ring, for torque adjustment when the drive shaft is rotated in only one direction, can be both increased and reduced.

If the first adjusting disc is first blocked by the spiral-like groove and the second adjusting disc driven, the diameter of the segmented ring is increased or reduced depending on the course of the spiral-like groove in the first adjusting disc. For example, it is assumed that the diameter of the segmented ring increases during the said direction of rotation of the second adjusting disc. If the blocked condition of the first adjusting disc is then cleared and the outer ring blocked, the first adjusting disc also moves in this direction when the direction of rotation of the second adjusting disc is the same, but with the relative speed between the two, as a result of the pinion, being set in such a way that the diameter of the segmented ring is reduced. Thus, it is no longer necessary to rotate the drive shaft in opposite directions to change the diameter of the segmented ring and consequently to adjust the torque.

The adjusting disc driven by means of the drive shaft can advantageously be firmly connected to a free wheel hump arranged on the drive shaft, so that the said adjusting disc is driven by the drive shaft only when the latter rotates in a certain direction, whereas it freewheels relative to the drive shaft when the latter rotates in the opposite direction.

Both adjusting discs can advantageously be positioned immediately next to one another, with the segmented ring being arranged on the side of the second adjusting disc facing away from the first adjusting disc. In this way a very robust and compact drive device is obtained.

According to an advantageous embodiment of the invention, the second adjusting disc is firmly connected to the freewheel hub. This second adjusting disc carries the pinion, with the first gear rim being attached to the first adjusting disc. The outer ring, as regards its positioning, is arranged at least partially between the first and the second adjusting disc, which on its part has radially running through slots. By means of these measures, the stability of the drive device and its reliability are increased still further.

The segments of the segmented ring are held by blocking pieces which slide in the cutout or groove of the first adjusting disc, which blocking pieces are connected to a segment by a bolt penetrating a through slot. This makes it possible for the segments to be released from the second adjusting disc. Moreover, the connection between the respective blocking pieces and the segments is designed in such a way that jamming of the second adjusting disc between a blocking piece and a segment is prevented.

On their outer periphery, the segments preferably carry recesses for accommodating the endless drive element. The recesses, in one plane in which the center line of the drive shaft also runs, have a cross-section with side walls running in a V-shape, with the endless drive element having a corresponding cross-section. By this means, particularly efficient power transmission from the segmented ring onto the endless drive element is obtained. This can be, for example, a V-belt or a chain, on the chain links of which are attached, on both sides, wedge-shaped elements for forming a V-shaped chain cross-section.

According to another advantageous further development of the invention, the recesses of the segments, in a plane in which the center line of the drive shaft also runs, have a cross-section with side walls running in a V-shape, with clamp straps being arranged parallel to the side walls and being held by spacer elements at a distance from the latter, which clamp straps, at their ends located at the bottom of the recess, are bent and run at least roughly parallel to the drive shaft. At their sides facing towards one another, the clamp straps carry pressure elements which are designed in a wedge shape, which pressure elements, at their sides facing towards one another, are at right angles to the longitudinal direction of the drive shaft. Their associated endless drive element has a corresponding rectangular-shaped cross-section.

By means of this special embodiment of the segments, a conventional chain having chain sides running parallel to one another can be driven by the segmented ring. Under load, the chain is pressed onto the ends, located at the bottom of the segment, of the clamp straps, which, as a result of the spacer elements, which can be, for example, metal balls, are then moved towards one another. By this means, the pressure elements, which are designed in a V-shape and are made, for example, from a wear-resistant plastic or another suitable elastic material, are pressed against the chain, so that the latter is firmly clamped.

The metal balls advantageously lie in radially running grooves which are incorporated in the segmented ring and in the clamp strap opposite to obtain a defined movement of these balls. Moreover, the space between the clamp straps and the respective segment is filled with an elastic material, so that the clamp strap can reassume the original position when pressure is removed.

According to a further advantageous embodiment of the invention, one segment consists of a first segmented part, which sits against the second adjusting disc, and a separate, second segmented part which can be moved in the axial direction relative to the first segmented part. This second segmented part, in order to clamp the endless drive element against the first segmented part, can be moved by means of actuating elements, which connect both segmented parts to one another.

At least one clamping angle and bracket are available as actuating elements, with a leg of the clamping angle, which can be rotated in the area of the apex about an angle connected to the first segmented part, representing a side part for forming the recess on the outer periphery of the segment. Even better conveyance of the endless drive element is ensured by means of a segmented ring constructed from such segments.

As already mentioned, the drive device according to the invention can be used for driving any rotational axles of machines or wheels. Moreover, devices of the said type can be arranged on both the drive shaft and the driven shaft.

The said device can also be used advantageously in cycles, with the drive shaft being connected to pedals, whereas the endless drive element is designed in a chain shape and loops around a gear wheel arranged on the cycle axle to be driven.

Figure 2:
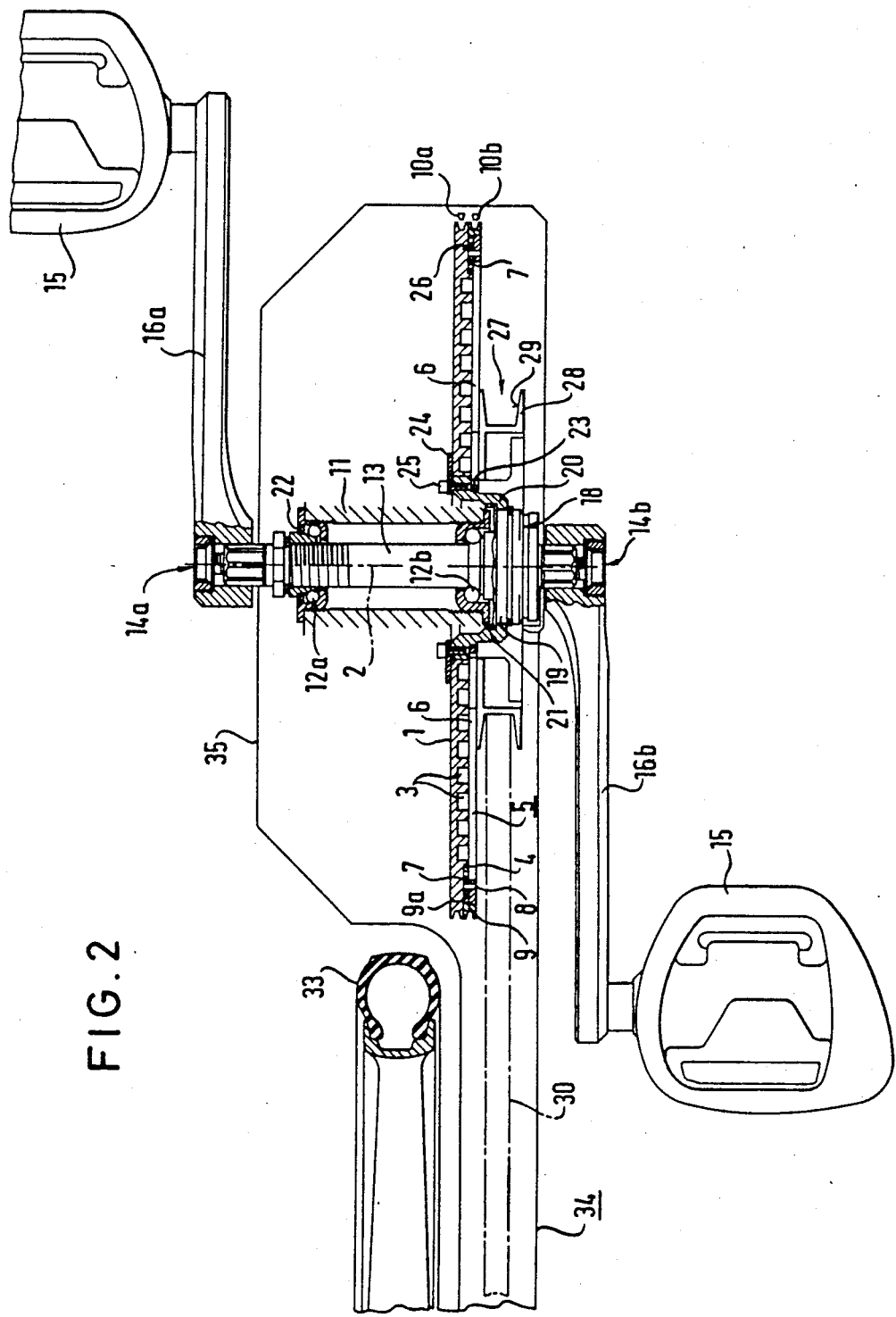
Figure 4:
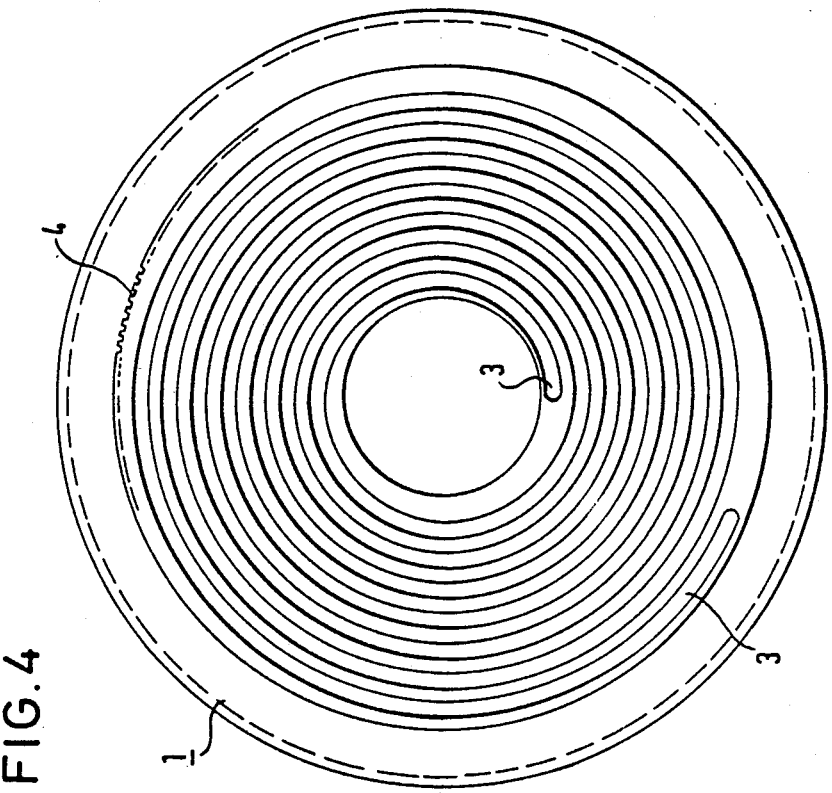
Figure 3:
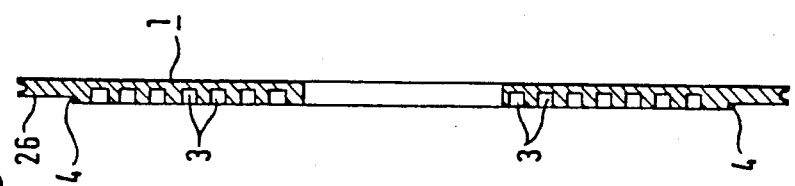
Figure 6:
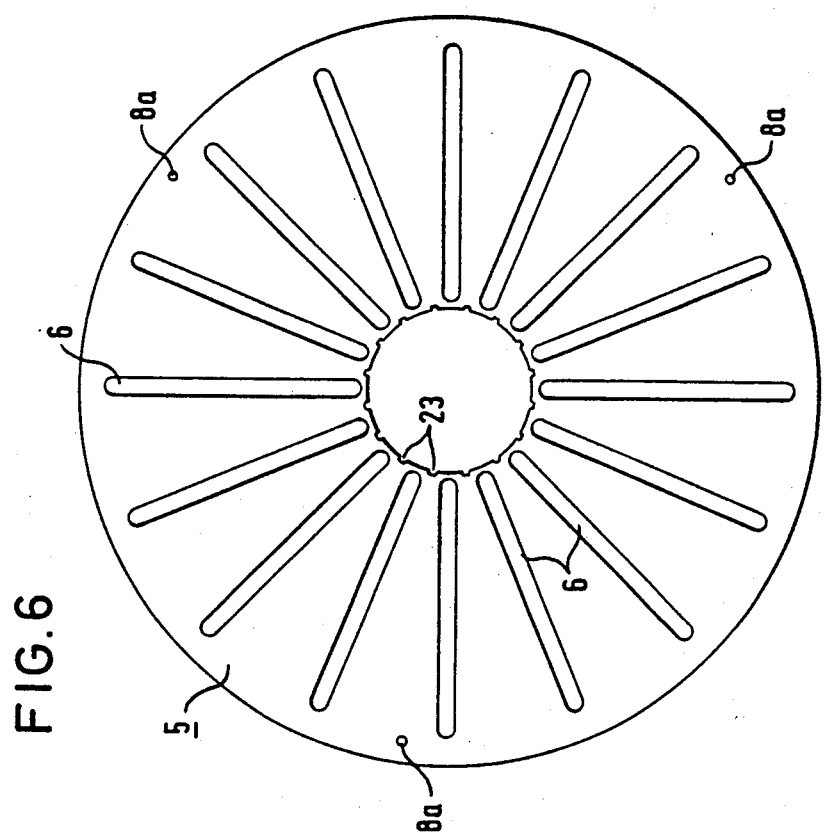
Figure 5:
Figure 7:
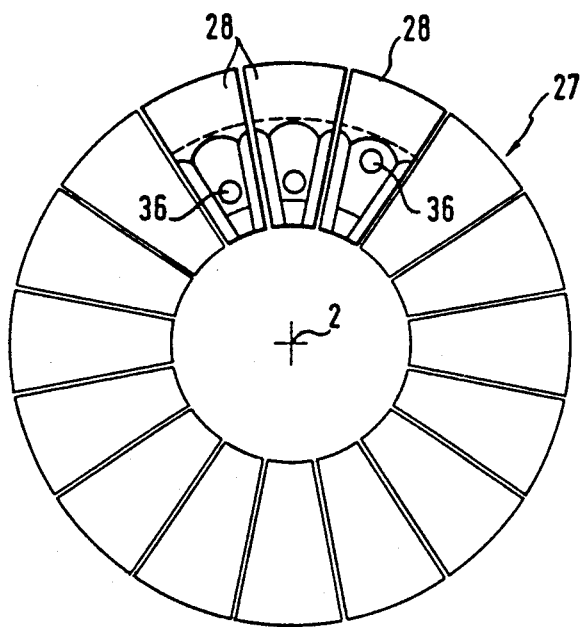
Figure 8:
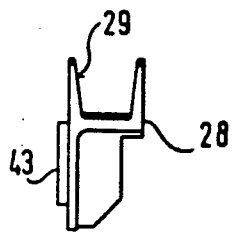
Figure 9:
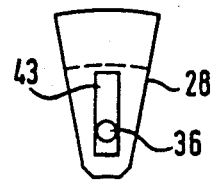
Figure 10:
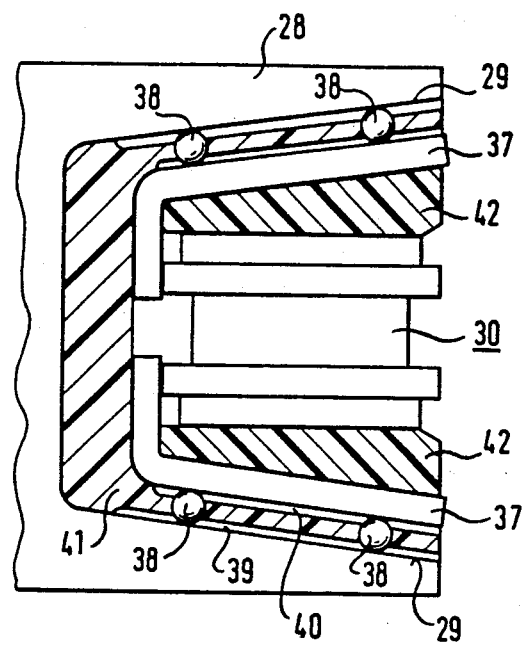
Figure 13:
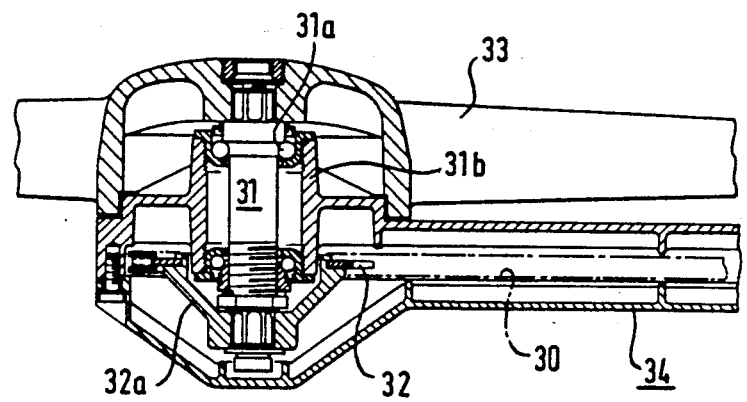
Figure 11:
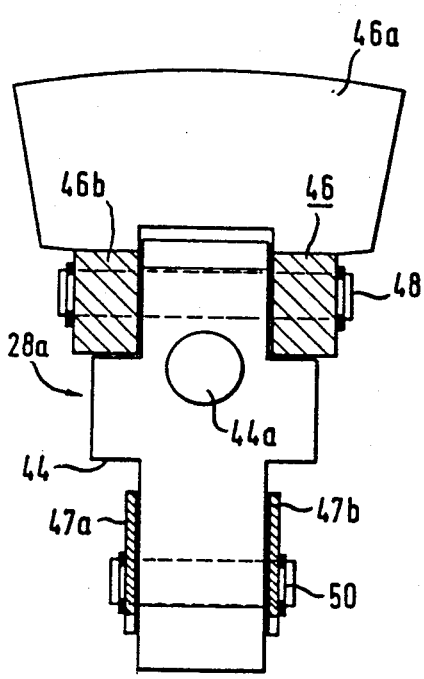
Figure 12:
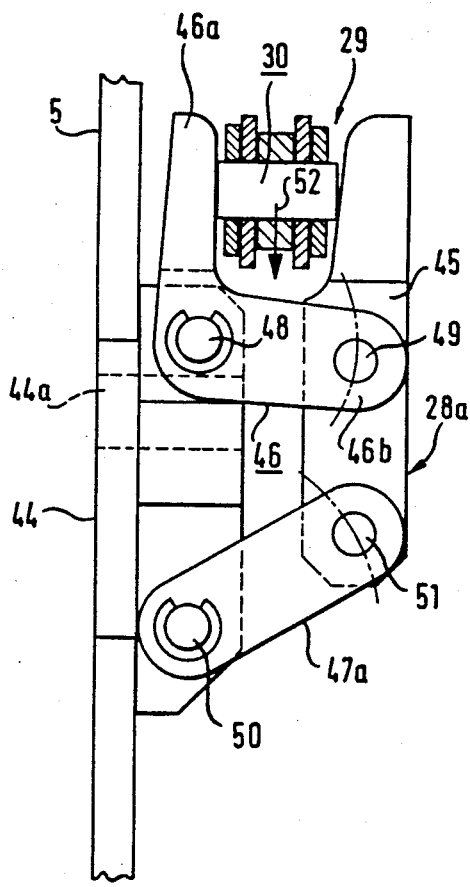

An illustrative embodiment of the invention is described in greater detail with reference to the drawing, wherein:

FIG. 1 shows a diagrammatic representation to explain the method of operation of the drive device according to the invention, FIG. 2 shows an axial section of a drive device according to the invention and connected to a cycle, FIGS. 3 and 4 show an axial section of a plan view of the first adjusting disc with a groove designed in a spiral shape, FIGS. 5 and 6 show an axial section and a plan view of the second adjusting disc with radial slots, FIGS. 7 to 9 show an end and a front view of a segmented ring or segments forming the segmented ring, FIG. 10 shows a cross-section through a segment in a plane in which the center line of the drive shaft runs, FIG. 11 shows a plan view of a section of a further segment, FIG. 12 shows an end view of the further segment, and FIG. 13 shows a wheel axle with a gear wheel acting as a drive element, on which gear wheel sits a chain-like endless drive element.

FIG. 1 shows a diagrammatic representation to explain the method of operation of the device according to the invention. It has a first adjusting disc 1 which is rotatably arranged about a center axis 2. In the first adjusting disc 1 is located, for example on one side, a spiral-like groove 3 which runs around the center axis 2 and opens towards the edge of the first adjusting disc 1. Moreover, on the side of the spiral-like groove 3, the first adjusting disc 1 is preferably connected in one piece to a first gear rim 4 lying coaxially with the center axis 2. For the sake of clarity, this first gear rim 4 is only partially shown.

A second adjusting disc 5 is arranged coaxially with the center axis 2 and directly located on the first adjusting disc 1, in which second adjusting disc 5 are located through slots 6. These radial slots 6 extend over the area of the spiral-like groove 3 in the first adjusting disc 1. For the sake of clarity, the second adjusting disc 5 is also only shown partially as a sector. A pinion 7 is connected to the second adjusting disc 5, which pinion 7 can be rotated about an axle 8 which runs parallel to the center axis 2 and is held by the second adjusting disc 5. Moreover, the pinion 7 is located between the first adjusting disc 1 and the second adjusting disc 5 and is positioned in such a way that it meshes, with the first gear rim 4 on the first adjusting disc 1.

Moreover, an outer ring 9 is rotatably positioned between the first adjusting disc 1 and the second adjusting disc 5, which outer ring 9 also lies coaxially with the center axis 2. It is secured by the said two adjusting discs 1 and 5 against axial displacement. At its inner periphery, this outer ring 9 carries a second gear rim 9a which also meshes with the pinion 7.

By means of a blocking device (not shown) both the first adjusting disc 1 and the outer ring 9 can be alternately blocked by stopper elements 10a and 10b, for example, being pressed onto their outer periphery. Simultaneous blocking of the elements 1 and 9 by the stopper elements 10a and 10b is not possible. However, both stopper elements 10a and 10b can be released at the same time.

A segmented ring (not shown), which consists of individual segments, is arranged coaxially with the center axis 2 on the side of the second adjusting disc 2 facing away from the first adjusting disc 1, by means of which segmented ring an endless drive element, for example a chain, runs to an axle to be driven. As shown for example in FIG. 1, such a segment can be moved along the radial slot 6, with it also engaging into the spiral-like groove by means of an extension so that finally its movement path is determined by the spiral-like groove 3 and the radial slot 6. For the sake of clarity, the segment is not shown and the said extension is designated 11.

If the second adjusting disc 5 is rotated, for example clockwise, by a drive device, which will be described in greater detail later, and if the first adjusting disc 1 and the outer ring 9 are not blocked, the first adjusting disc 1 is driven together with the second adjusting disc 5 by the extension 11, so that it is moved in the same direction and at the same speed as the second adjusting disc 5. In this case, the segmented ring does not change in diameter.

On the other hand, if the first adjusting disc 1 is blocked by the stopper 10a or made stationary relative to the center axis 2, and if only the second adjusting disc 5 is moved clockwise, the extension 11 is guided outwards in the spiral-like groove 3, with the diameter of the segmented ring being increased. Moreover, the stopper 10b is released from the outer ring 9, so that the latter can also be moved.

To reduce the diameter of the segmented ring, at the same time as the second adjusting disc 5 is rotated clockwise, the first adjusting disc 1 is released, whereas the outer ring 9 is blocked by the stopper 10b. At the same time, the axle 8 also moves clockwise together with the second adjusting disc 5, whereas the pinion 7, as a result of the stationary outer ring 9 or stationary second gear rim 9a, is rotated anticlockwise about the axle 8. By this means, the first adjusting disc 1 is also driven clockwise by the first gear rim 4, but at a higher speed compared with the second adjusting disc 5, so that the extension 11 in the groove 3 is moved towards the center of the spiral. Consequently, the diameter of the segmented ring is continuously reduced. In this way, a device for the stepless torque adjustment is obtained.

FIG. 2 shows a device according to the invention and in connection with a bicycle. Moreover, the same parts as in FIG. 1 are provided with the same reference numbers.

A drive shaft 13 is rotatably mounted by means of a bearing housing 11 fixed to the frame of the bicycle and by ballbearings 12a and 12b, on the ends of which drive shaft 13 lever arms 16a and 16b, which are provided with pedals 15, are fixed by suitable plug-in or screw connections 14a and 14b. A freewheel hub 18 is mounted on the drive shaft 13, which freewheel hub 18 is driven when the drive shaft 13 rotates in one direction or freewheels when the drive shaft 13 rotates in the opposite direction. A bushing 20 and 21 is firmly connected to the freewheel hub 18 by means of a gear rim plug-in connection 19, by means of which bushing 20 and 21 the transmission can be axially displaced relative to the drive shaft 13. This bushing 20 and 21 ensures that a relatively large distance can be selected between the bearings 12a and 12b. The bearing 12a is protected against external influences by the seal 22. The second adjusting disc 5, which has the radially running through slots 6, is also firmly connnected to the bushing 20, and in fact preferably by an additional gear rim plug-in connection 23. Moreover, the first adjusting disc 1 is rotatably mounted on the bushing 20, which first adjusting disc 1 sits directly against the second adjusting disc 5 and is secured against axial displacement by means of a ring 24 which is fixed to the bushing 20 by screws 25. Moreover, the spiral-like groove 3 is located on the side of the first adjusting disc 1 facing towards the second adjusting disc 5.

Moreover, the first adjusting disc 1, on the side pointing towards the second adjusting disc 5, has a cutout 26 or step which, on its surface running at right angles to the disc plane, carries the first gear rim 4. The pinion 7 meshes with this first gear rim 4, which pinion 7 is rotatably mounted on an axle 8 which is firmly connected to the second adjusting disc 5.

One part of the outer ring 9 engages between the first adjusting disc 1 and the second adjusting disc 5 and carries on its inside periphery the second gear rim 9a, with which the pinion 7 also meshes. The outer ring 9 is secured against axial displacement by the two adjusting discs 1 and 5.

Blocking elements 10a and 10b are available for blocking the first adjusting disc 1 or the outer ring 9, which blocking elements 10a and 10b are only shown symbolically for the sake of clarity. For example, they can engage in corresponding grooves on the periphery of the first adjusting disc 1 or the outer ring 9 and fix these components relative to the bearing housing 11. The blocking elements 10a and 10b are preferably to be operated from the handle bar of the bicycle. For example, this can be carried out by loop-like elements which run into the corresponding grooves on the outer periphery of the first adjusting disc 1 or the outer ring 9.

The segmented ring 27 mentioned previously is arranged on the side of the second adjusting disc 5 facing away from the first adjusting disc 1. It consists of as many individual segments 28 as there are radial slots 6 in the second adjusting disc 5. The individual segments 28 sit tightly against the second adjusting disc 5 and are displaceably connected to the latter, as will be described in greater detail below. Moreover, another extension on each segment 28 engages in the spiral-like groove, so that the segment 28 can be continually displaced in the radial direction to change the diameter of the segmented ring 27.

The individual segments 28, on the outer periphery of the segmented ring 27, have recesses 29 into which an endless drive element 30 runs which is driven as a result of the rotation of the segmented ring 27. This endless drive element, for example a belt or a chain, loops around a drive element 32, which is arranged on the rear axle 31 (FIG. 13) of the bicycle, for driving the rear wheel 33 which is also firmly connected to the rear axle 31. The rear axle 31 can be mounted, for example, on one side of a drive extension 34 through which the endless drive element 30 also runs. The entire drive device according to the invention is hermetically sealed by a protective cap 35 for protection against external influences.

The first adjusting disc 1 is shown in greater detail in FIGS. 3 and 4. It is preferably made of aluminum and has an outer diameter of about 270 mm, an inner diameter of 72 mm and a thickness of 7 mm. All dimensions can of course vary within a tolerance range. The spiral groove incorporated on one side of the first adjusting disc 1 has a groove width of about 6 mm and a lead of about 10 mm per revolution. The depth of the spiral groove 3 is about 4.6 mm, whereas the axial depth of the step-shaped cutout 26 is about 2.1 mm.

The exact design of the second adjusting disc 5 is shown in greater detail in FIGS. 5 and 6. It is made, for example, of spring steel and has a diameter of 260 mm and a thickness of about 3 mm. A total of 16 radially running through slots 6, arranged at the same angular distances, are available which have a radial extent of 58 mm and a width of about 6 mm. All sizes can of course vary within a tolerance range. The inner periphery of the second adjusting disc 5 is provided with tooth-like recesses to obtain the abovementioned gear rim plug-in connection 23 for connecting the second adjusting disc 5 firmly to the bushing 20. The diameter of this center bore is about 58 mm. Three bores 8a are incorporated at the same angular distances on the outer periphery of the second adjusting disc 5, which bores 8a are used for accommodating plug-in axles 8, on which pinions 7 are mounted, as shown in FIG. 2. These pinions 7 have such an axial extent that they still find space within the step-shaped cutout of the first adjusting disc 1.

The segmented ring 27 and an end and plan view of the segments 28 are shown in FIGS. 7 to 9. The segmented ring 27 according to FIG. 7 has sixteen segments 28 which are separated from one another, are identical except for the position of the bores 36 and are made, for example, of aluminum. The bores 36 which run parallel to the center axis 2, are incorporated into the segments 28 in conformity with the spiral-like groove 3 in the first adjusting disc 1. That is, they follow the path of the spiral-like groove 3 and also have a pitch of 10 mm as seen over 360°. As already mentioned, the extensions 43 in FIGS. 8 and 9 engage in the radial slots 6 of the second adjusting disc 5, so that the segments 28 are guided in the radial direction by these extensions 43. The extensions 43 have, for example, a longitudinal extent of 20 mm and a width of 6 mm. So-called blocking pieces (not shown) are provided to connect the segments 28 to the second adjusting disc 5, which blocking pieces are arranged in a sliding manner in the spiral-like groove 3 of the first adjusting disc 1 and have a bolt which penetrates the bore 36 of a segment 28. At the end of the bolt is located a thread onto which a nut can be screwed for securing the segment 28. This connection is designed in such a way that jamming of the second adjusting disc 5 by the blocking pieces and the segments 28 is avoided. Moreover, the blocking piece and bolt can be designed in one piece.

As already mentioned in connection with FIG. 2, the segments 28 have recesses 29 located on the outer periphery of the segmented ring 27, which recesses 29, in a plane in which the center axis 2 also runs, have a cross-section with side walls running in a V-shape. These recesses 29 are used for accommodating a wedge-shaped endless drive element 30 having a corresponding cross-section. If the rear wheel 33 already mentioned is to be driven, the wedge-shaped endless drive element, when the segmented ring 27 is rotated, is pressed into the recesses 29, which also have a wedge-shaped cross-section, so that perfect power transmission is achieved. A conventional cycle chain, for example, can be used as an endless drive element 30 designed in a wedge shape, on the chain links of which cycle chain wedge-shaped elements are attached on both sides for forming a wedge-shaped chain cross-section. Moreover, both chain sides run at the same angle to one another. The abovementioned wedge-shaped elements can be made, for example, of a rubber or another suitable elastic plastic.

In order to use a conventional cycle chain 30 without wedge-shaped elements attached to the side of the chain, so-called clamp straps 37 are arranged on both sides in the V-shaped recess 29 within the segments 28, as can be seen from FIG. 10. These clamp straps 37 are bent at the lower end of the recesses 29, and at this location, run parallel to the center axis 2. Moreover, they are spaced by means of metal balls 38 or other suitable elements relative to the inner walls of a segment 28. Moreover, the metal balls 38 are mounted in practically radially running slots 39 and 40 in order to improve guidance. An elastic material 41 is arranged between the clamp straps 37 and the inner side walls of the segments 28, which elastic material can be, for example, a suitable rubber. The balls 38 are embedded in this material 41. Wedge-shaped elastic pressure elements 42 are attached to each of the sides, which face towards one another, of the clamp straps 37 in such a way that their sides facing towards one another run at right angles to the center axis 2. In this way a hollow space with a rectangular cross-section is produced between the pressure elements 42, into which hollow space can be incorporated a conventional chain 30 having chain sides running parallel to one another. When the chain 30 is loaded, it presses the bent ends of the clamp straps 37 towards the center axis 2, so that these clamp straps 37, as shown in FIG. 10, are moved downwards as a whole and, as a result of the metal balls 38, are at the same time moved towards one another. This leads to the chain 30 being clamped between the pressure elements 42, so that perfect power transmission between the segments 28 and the chain 30 is achieved. When the load is removed from the chain 30, the clamp straps 37 are again guided upwards by the elastic material 41, so that the chain 30 is released from the pressure elements 42.

The elastic material 41 is firmly connected to the segments 28 and the clamp straps 37, on which the pressure elements 42 are firmly arranged. The firm connection between the elements 28, 41, 37 and 42 can be effected, for example, by a vulcanization process. The same also applies to the fixing of the wedge-shaped elements on both sides of a conventional chain already mentioned.

A further segment 28a is shown in FIGS. 11 and 12 with FIG. 11 showing a plan view of a section which runs parallel to the adjusting discs 1 and 5, whereas FIG. 12 shows the end view of the further segment 28a.

The segment 28a consists of a first segmented part 44 which sits against the second adjusting disc 5. As already mentioned, the first segmented part is connected to the said adjusting discs 1 and 5 by means of a bolt (not shown) which is led through a bore 44a in the first segmented part 44, so that the segmented part can be moved by these adjusting discs 1 and 5 in the radial direction of the second adjusting disc 5.

A second segmented part 45 is located over the first segmented part 44, which second segmented part 45 is spaced relative to the first segmented part 44 in the axial direction of the drive shaft 13. Both segmented parts 44 and 45 are connected to one another by actuating elements 46 and 47 and can be moved relative to one another by these actuating elements 46 and 47 in such a way that their mutual spacing is increased or decreased. The upper or radially outward located actuating element consists of an angular part 46 which, in the area of the apex, is rotatably arranged about an axle 48 which runs parallel to the plane of the second adjusting disc 5. Moreover, the axle 48 runs in the tangential direction relative to the second adjusting disc 5. The angle piece 46 has two legs 46a and 46b which run practically at right angles to one another. Moreover, the leg 46a pointing radially outwards represents a side part for forming the recess mentioned previously on the outer periphery of the segment 28a. The axially running leg 46b of the angle piece 46 is connected to the second segmented part 45 via the axle 49, which runs parallel to the axle 48.

Moreover, both segmented parts 44 and 45 are connected by two brackets 47a and 47b. These brackets 47a and 47b are attached on both sides of and on the lower end of the respective segmented parts 44 and 45. They are rotatably mounted relative to the axles 50 and 51 which penetrate through the respective segmented parts 44 and 45 in a direction parallel to the axle 48.

By means of a segment 28a designed such as this, an endless drive element, for example a conventional cycle chain 30, can be effectively clamped in the abovementioned recess 29 (cf. FIG. 12) when the load is applied. If a force acts in the radial direction 52 when the chain 30 is loaded, the angle piece 46 is rotated clockwise about the axle 48, while at the same time the second segmented part 45 is pressed towards the left (as viewed in FIG. 12) against the chain 30. When the load on the chain 30 is removed, on the other hand, the chain 30 can easily be guided out of the opening 29.

The individual parts of the segment 28a are preferably made from an injection die casting to obtain a transmission which is as light as possible.

FIG. 13 shows a section through the axle to be driven off a wheel 33. The axle 31 is mounted on the drive extension 34 by means of a bearing device 31a and 31b and carries on one side the wheel 33 to be driven. A gear wheel 32 is arranged on the other side of the axle 31 which gear wheel 32 is firmly connected to the axle 31 by a funnel-shaped element 32a. If the segmented ring is increased and reduced in diameter in only one direction of rotation of the second adjusting disc 5, then the gear wheel is only rotated in one direction. Because the second adjusting disc 5 is arranged on the freewheel hub 18 (FIG. 2), the gear wheel 32 is not driven when the drive axle 13 is rotated in the opposite direction.

On the other hand, if the diameter of the segmented ring is increased or reduced by rotating the second adjusting disc 5 in different directions, the gear wheel 32 must also be able to rotate in opposite directions. In this case, the gear wheel 32 is arrranged on a freewheel hub (not shown) which is connected to the axle 31.

A chain tightener (not shown) is of course also connected to the device according to the invention, which chain tightener ensures that the chain is always in a tensioned condition for each segmented ring diameter set.

We claim:

1. A drive device having stepless torque adjustment, wherein:
   a drive shaft is rotatably mounted by means of a bearing device;
   a first adjusting disc is arranged coaxially with the drive shaft into which adjusting disc is incorporated a spiral-like cutout at least partially around the center of the first adjusting disc;
   a second adjusting disc is arranged coaxially with the drive shaft into which second adjusting disc are incorporated through slots which run outwards from the center of the second adjusting disc;
   a segmented ring consisting of individual segments is arranged coaxially with the drive shaft, onto an outer periphery of which segmented ring can be placed an endless drive element;
   the segments each have extensions which engage both in the spiral-like cutout and in an allocated through slot;
   one of the said adjusting discs being driven by the drive shaft; and
   the other non-driven adjusting disc being blocked relative to the bearing device by means of a blocking device.

2. A drive device as claimed in claim 1, wherein the spiral-like cutout in the first adjusting disc is a groove, and wherein the second adjusting disc is arranged on a side of the spiral-like groove.

3. A drive device as claimed in claim 2, wherein:
   one adjusting disc, on its outer peripheral area and on a side facing towards the other adjusting disc, carries a pinion which is freely rotatable about an axle running parallel to the drive shaft;
   the pinion meshes with a first gear rim attached to the other adjusting disc;
   an outer ring is available which, on an inner periphery carries a second gear rim with which the pinion also meshes; and
   the outer ring can only be blocked relative to the bearing device when the adjusting disc which can be blocked is in the unblocked condition.

4. A drive device as claimed in claim 3, wherein the adjusting disc driven by means of the drive shaft is firmly connected to a freewheel hub arranged on the drive shaft.

5. A drive device as claimed in claim 1, wherein both adjusting discs are positioned immediately next to one another, and wherein the segmented ring is arranged on the side of the second adjusting disc facing away from the first adjusting disc.

6. A drive device as claimed in claim 4, wherein the second adjusting disc is firmly connected to the freewheel hub, and the through slots run radially.

7. A drive device as claimed in claim 6, wherein the second adjusting disc carries the pinion, and the first gear rim is attached to the first adjusting disc.

8. A drive device as claimed in claim 7, wherein the outer ring, as regards its positioning, is arranged at least partially between the first and second adjusting discs.

9. A drive device as claimed in claim 5, wherein the segments are held by blocking pieces which slide in the cutout or groove of the first adjusting disc which blocking pieces can be connected to a segment by a bolt penetrating a through slot.

10. A drive device as claimed in claim 1, wherein the segments, on their outer periphery, have recesses for accommodating the endless drive element.

11. A drive device as claimed in claim 10, wherein the recesses, in one plane in which the center line of the drive shaft also runs, have a cross-section with side walls running in a V-shape and wherein the endless drive element has a corresponding cross-section.

12. A drive device as claimed in claim 11, wherein the endless drive element is a V-belt.

13. A drive device as claimed in claim 11, wherein the endless drive element is a chain, on the chain links of which are firmly attached, on both sides, wedge-shaped elements for forming a V-shaped chain cross-section.

14. A drive device as claimed in claim 10, wherein the recesses, in a plane in which the center line of the drive shaft also runs, have a cross-section with side walls running in a V-shape, wherein clamp straps are arranged parallel to the side walls and are held by spacer elements at a distance from the latter, which clamp straps, at their ends located at the bottom of the recess, are bent and run at least roughly parallel to the drive shaft, wherein the clamp straps on their sides facing towards one another, carry pressure elements which are designed in a wedge shape, which pressure elements, with their sides facing towards one another, run at right angles to the longitudinal direction of the drive shaft, and wherein the endless drive element has a corresponding rectangular cross-section.

15. A drive device as claimed in claim 14, wherein the space elements are metal balls.

16. A drive device as claimed in claim 15, wherein the metal balls are mounted in radially running grooves.

17. A drive device as claimed in claim 14, wherein the space between the clamp straps and the respective segment is filled with an elastic material.

18. A drive device as claimed in claim 13, wherein the wedge-shaped elements or the pressure elements are made of an elastic material.

19. A drive device as claimed in claim 14, wherein the endless drive element is a chain with a rectangular cross-section.

20. A drive device as claimed in claim 17, wherein the elastic material and the pressure elements are undetachably connected to clamp straps or to the segments.

21. A drive device as claimed in claim 10, wherein one segment consists of a first segmented part, which sits against the second adjusting disc, and a separate, second segmented part which can be moved in the axial direction relative to the first segmented part, which second segmented part, in order to clamp the endless drive element against the first segmented part, can be moved by means of actuating elements which connects both segmented parts to one another.

22. A drive device as claimed in claim 21, wherein at least one clamp angle piece and one bracket are available as actuating elements, and wherein a leg of the clamp angle piece, which can be rotated in the area of the apex about an axle connected to the first segmented part, represents a side part for forming the recess on the outer periphery of the segment.

23. A cycle having two or more wheels, a drive device which can be actuated by pedals, which drive device for driving the cycle, is connected to a gear wheel by endless drive elements, which gear wheel is arranged on the axle of at least one wheel, wherein the drive device comprises:

a drive shaft rotatably mounted by means of a bearing device;

a first adjusting disc arranged coaxially with the drive shaft into which adjusting disc is incorporated a spiral-like cutout at least partially around the center of the first adjusting disc;

a second adjusting disc arranged coaxially with the drive shaft into which second adjusting disc are incorporated through slots which run outwards from the center of the second adjusting disc;

a segmented ring consisting of individual segments arranged coaxially with the drive shaft onto an outer periphery of which segmented ring can be placed an endless drive element;

the segments each have extensions which engage both in the spiral-like cutout and in an allocated through slot;

one of the said adjusting discs being driven by the drive shaft; and the other non-driven adjusting disc being blocked relative to the bearing device by means of a blocking device.

* * * * *